United States Patent
Huang et al.

(10) Patent No.: US 10,362,560 B2
(45) Date of Patent: Jul. 23, 2019

(54) MULTIMEDIA BROADCAST MULTICAST COMMUNICATION METHOD, APPARATUS, AND SYSTEM

(71) Applicant: Huawei Technologies Co., Ltd., Shenzhen (CN)

(72) Inventors: Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 15/594,339

(22) Filed: May 12, 2017

(65) Prior Publication Data
US 2017/0251453 A1 Aug. 31, 2017

Related U.S. Application Data

(63) Continuation of application No. PCT/CN2014/091014, filed on Nov. 13, 2014.

(51) Int. Cl.
*H04W 4/00* (2018.01)
*H04W 72/00* (2009.01)
(Continued)

(52) U.S. Cl.
CPC ........... *H04W 72/005* (2013.01); *H04W 4/06* (2013.01); *H04W 36/22* (2013.01); *H04W 72/0406* (2013.01); *H04L 12/189* (2013.01)

(58) Field of Classification Search
CPC . H04W 72/005; H04W 72/0406; H04W 4/06; H04W 36/22; H04L 12/189
(Continued)

(56) References Cited

U.S. PATENT DOCUMENTS

2011/0274025 A1  11/2011  Hsu
2013/0003640 A1   1/2013  Yang et al.
(Continued)

FOREIGN PATENT DOCUMENTS

CN  101170466 A  4/2008
CN  101990160 A  3/2011
(Continued)

OTHER PUBLICATIONS

"MBMS Dynamic Scheduling," 3GPP TSG-RAN WG2 Meeting #66, San Francisco, USA, R2-092962, 3rd Generation Partnership Project, Valbonne, France (May 4-8, 2009).
(Continued)

*Primary Examiner* — Chuong T Ho
(74) *Attorney, Agent, or Firm* — Leydig, Voit & Mayer, Ltd.

(57) ABSTRACT

The embodiments of the present invention relates to a multimedia broadcast multicast communication method, an apparatus, and a system. The method includes: receiving, by a base station, first indication information at a first time, where the first indication information instructs the base station to suspend transmitting service data in a multimedia broadcast multicast service MBSFN manner; and sending, by the base station, second indication information to user equipment UE according to the first indication information, so that the UE suspends, at a second time according to the second indication information, receiving the service data in the MBSFN manner. The first time is earlier than the second time, and duration between the first time and the second time is less than a multicast control channel MCCH modification period. The user equipment is notified in a more timely manner to suspend transmitting the service data in the MBSFN manner.

18 Claims, 5 Drawing Sheets

(51) Int. Cl.
*H04W 36/22* (2009.01)
*H04W 4/06* (2009.01)
*H04W 72/04* (2009.01)
*H04L 12/18* (2006.01)

(58) Field of Classification Search
USPC .......................................... 370/329, 330, 241
See application file for complete search history.

(56) References Cited

U.S. PATENT DOCUMENTS

| | | | |
|---|---|---|---|
| 2013/0094428 A1 | 4/2013 | Lee | |
| 2013/0215761 A1* | 8/2013 | Xu | H04W 24/08 370/241 |
| 2016/0094358 A1* | 3/2016 | Won | H04L 12/1881 370/230 |
| 2017/0318560 A1* | 11/2017 | Xu | H04W 4/06 |
| 2018/0288576 A1* | 10/2018 | Xu | H04W 4/06 |

FOREIGN PATENT DOCUMENTS

| | | |
|---|---|---|
| CN | 102164347 A | 8/2011 |
| CN | 103026642 A | 4/2013 |
| EP | 2262290 A1 | 12/2010 |
| WO | WO 2012122772 A1 | 9/2012 |

OTHER PUBLICATIONS

"MCH support on NCT," 3GPP TSG-RAN WG2 Meeting #81bis, Chicago, U.S.A, R2-131180, 3rd Generation Partnership Project, Valbonne, France (Apr. 15-19, 2013).

"Proposed concept for eMBMS congestion management," 3GPP TSG RAN WG3 Meeting #85bis, Shanghai, China, R3-142423, 3rd Generation Partnership Project, Valbonne, France (Oct. 6-10, 2014).

* cited by examiner

| 1 | R | E | LCID of A | F | Length of A |

| R | R | E | LCID of A | F | Length of A |
| R | R | E | LCID of A | F | 0 | — Add

MULTIMEDIA BROADCAST MULTICAST COMMUNICATION METHOD, APPARATUS, AND SYSTEM

CROSS-REFERENCE TO RELATED APPLICATIONS

This application is a continuation of International Application No. PCT/CN2014/091014, filed on Nov. 13, 2014, the disclosure of which is hereby incorporated by reference in its entirety.

TECHNICAL FIELD

The embodiments of the present invention relates to the field of communications technologies, and in particular, to a multimedia broadcast multicast communication method, an apparatus, and a system.

BACKGROUND

Multimedia broadcast multicast service (MBMS for short) is a communications technology for simultaneously sending same data to multiple user equipments (UE for short) by using multiple base stations. The MBMS communications technology is mainly applied to a Long Term Evolution (LTE for short) wireless communications network. MBMS service data is transmitted by using a multimedia broadcast multicast service single frequency network (MBSFN for short) subframe.

Generally, data of a service is referred to as service data, data transmitted in an MBSFN manner is referred to as MBMS service data, and a service to which the MBMS service data belongs is referred to as an MBMS service. When traffic of MBMS service data is larger than traffic that the MBSFN subframe can bear, a part of the MBMS service data is discarded.

To avoid discarding MBMS service data, a part of the service data may be transmitted in another manner, such as in a unicast manner. Therefore, the UE needs to be notified in advance that transmitting the part of the service data in the MBSFN manner is to be suspended.

The UE cannot be notified in a timely manner by using the existing solution for notifying the UE in advance.

SUMMARY

Embodiments of the present invention provide a multimedia broadcast multicast communication method, an apparatus, and a system, so as to notify UE in a more timely manner that transmitting service data in an MBSFN manner is to be suspended.

According to a first aspect, an embodiment of the present invention provides a multimedia broadcast multicast communication method including:

receiving, by a base station, first indication information at a first time, where the first indication information is used to indicate that transmitting service data in a multimedia broadcast multicast service MBSFN manner is to be suspended; and sending, by the base station, second indication information to user equipment UE according to the first indication information, so that the UE suspends, at a second time according to the second indication information, receiving the service data in the MBSFN manner, where the first time is earlier than the second time, and duration between the first time and the second time is less than a multicast control channel MCCH modification period.

With reference to the first aspect, in a first possible implementation manner, the sending, by the base station, second indication information to user equipment UE according to the first indication information includes: sending, by the base station, the second indication information to the UE according to the first indication information by adding the second indication information into a Medium Access Control MAC data packet sent to the UE.

The first indication information is added into the MAC data packet without limitation of an MCCH modification period, so that a network side can send the first indication information to user equipment in a timely manner.

With reference to the first possible implementation manner of the first aspect, in a second possible implementation manner, the second indication information is carried in a MAC header MAC header of the MAC data packet.

The existing MAC header is used to carry the first indication information, so that the existing MAC protocol is compatible, and an existing system is slightly modified.

With reference to the second possible implementation manner of the first aspect, in a third possible implementation manner, the second indication information is carried in a MAC sub-header corresponding to the service data in the MAC header.

The MAC sub-header corresponding to the service in the existing MAC header is used to carry the first indication information, so that the existing MAC protocol is compatible, and an existing system is slightly modified.

With reference to one of the first aspect or the first to the third possible implementation manners of the first aspect, in a fourth possible implementation manner, the first time includes: a first multicast channel scheduling period MSP; or a first time point; or a first transmission time interval TTI; or a first subframe.

With reference to one of the first aspect or the first to the fourth possible implementation manners of the first aspect, in a fifth possible implementation manner, the second time includes: a second MSP; or a second time point; or a second TTI; or a second subframe.

Different forms of the first time and the second time enable a system to set a time more flexibly.

With reference to the fourth possible implementation manner of the first aspect, in a sixth possible implementation manner, the first indication information is further used to indicate the second time.

The second time is added into the first indication information, so that an eNB can dynamically obtain a time for suspending transmitting service data in an MBSFN manner, and a system is more flexible and can be applied to different scenarios and network environments.

With reference to the sixth possible implementation manner of the first aspect, in a seventh possible implementation manner, the first indication information includes a first index and a second index, and the second time is an MSP indicated by the second index in the MCCH modification period corresponding to the first index.

A particular MSP in which transmitting service data in an MBSFN manner is to be suspended is designated by using an index, so that the existing MBMS protocol is compatible, and a system is slightly affected.

With reference to one of the first aspect or the first to the seventh possible implementation manners of the first aspect, in an eighth possible implementation manner, the first indication information is further used to indicate a notification time, and the notification time is earlier than the second time and later than the first time; and the sending, by the base station, second indication information to user equipment UE according to the first indication information includes: sending, by the base station, the second indication information to the UE at the notification time according to the first indication information.

A notification time is delivered to a base station, so that base stations in an MBSFN area can synchronously notify UE that transmitting service data in an MBSFN manner is to be suspended, and this is beneficial to system stability.

With reference to one of the first aspect or the first to the eighth possible implementation manners of the first aspect, in a ninth possible implementation manner, the second indication information includes the second time.

The second time is added into the second indication information, so that UE can dynamically obtain a time for suspending transmitting service data in an MBSFN manner, and a system is more flexible and can be applied to different scenarios and network environments.

With reference to one of the first aspect or the first to the ninth possible implementation manners of the first aspect, in a tenth possible implementation manner, the first indication information is sent by a multi-cell/multicast coordination entity MCE.

The MCE notifies the base station, so that an existing network element can be utilized to the maximum, and an existing network is slightly affected.

According to a second aspect, an embodiment of the present invention provides a multimedia broadcast multicast communication method including: determining, by a multi-cell/multicast coordination entity MCE, to suspend transmitting service data in a multimedia broadcast multicast service MBSFN manner in a multimedia broadcast multicast service single frequency network MBSFN area; and sending, by the MCE, indication information to a base station at a first time, so that the base station notifies user equipment UE that transmitting the service data in the MBSFN manner is to be suspended at a second time, where the first time is earlier than the second time, and duration between the first time and the second time is less than a multicast control channel MCCH modification period.

With reference to the second aspect, in a first possible implementation manner of the second aspect, before the determining, by a multi-cell/multicast coordination entity MCE, to suspend transmitting service data in a multimedia broadcast multicast service MBSFN manner, the method further includes: receiving, by the MCE, a notification message sent by the base station, where the notification message is used to indicate that congestion occurs in the MBSFN area.

With reference to the second aspect or the first possible implementation manner of the second aspect, in a second possible implementation manner, the first time includes: a first multicast channel scheduling period MSP; or a first time point; or a first transmission time interval TTI; or a first subframe.

With reference to the second aspect, or the first or the second possible implementation manner of the second aspect, in a third possible implementation manner, the second time includes: a second MSP; or a second time point; or a second TTI; or a second subframe.

With reference to one of the second aspect or the first to the third possible implementation manners of the second aspect, in a fourth possible implementation manner, the indication information is further used to indicate the second time.

With reference to the fourth possible implementation manner of the second aspect, in a fifth possible implementation manner, the indication information includes a first index and a second index, and the second time is an MSP indicated by the second index in the MCCH modification period corresponding to the first index.

With reference to one of the second aspect or the first to the fifth possible implementation manners of the second aspect, in a sixth possible implementation manner, the indication information is further used to indicate a notification time, so that the base station notifies, at the notification time, the UE that transmitting the service data in the MBSFN manner is to be suspended at the second time, and the notification time is earlier than the second time and later than the first time.

According to a third aspect, an embodiment of the present invention provides a base station including: a receiving unit, configured to receive first indication information at a first time, where the first indication information is used to indicate that transmitting service data in a multimedia broadcast multicast service MBSFN manner is to be suspended; and a sending unit, configured to send second indication information to user equipment UE according to the first indication information, so that the UE suspends, at a second time according to the second indication information, receiving the service data in the MBSFN manner, where the first time is earlier than the second time, and duration between the first time and the second time is less than a multicast control channel MCCH modification period.

With reference to the third aspect, in a first possible implementation manner of the third aspect, the sending unit is configured to send the second indication information to the UE according to the first indication information by adding the second indication information into a Medium Access Control MAC data packet sent to the UE.

With reference to the first possible implementation manner of the third aspect, in a second possible implementation manner, the second indication information is carried in a MAC header MAC header of the MAC data packet.

With reference to the second possible implementation manner of the third aspect, in a third possible implementation manner, the second indication information is carried in a MAC sub-header corresponding to the service data in the MAC header.

With reference to one of the third aspect or the first to the third possible implementation manners of the third aspect, in a fourth possible implementation manner, the first time includes: a first multicast channel scheduling period MSP; or a first time point; or a first transmission time interval TTI; or a first subframe.

With reference to one of the third aspect or the first to the fourth possible implementation manners of the third aspect, in a fifth possible implementation manner, the second time includes: a second MSP; or a second time point; or a second TTI; or a second subframe.

With reference to the fourth possible implementation manner of the third aspect, in a sixth possible implementation manner, the first indication information is further used to indicate the second time.

With reference to the sixth possible implementation manner of the third aspect, in a seventh possible implementation manner, the first indication information includes a first index and a second index, and the second time is an MSP indicated by the second index in the MCCH modification period corresponding to the first index.

With reference to one of the third aspect or the first to the seventh possible implementation manners of the third aspect, in an eighth possible implementation manner, the first indication information is further used to indicate a notification time, and the notification time is earlier than the second time and later than the first time; and the sending unit is configured to send the second indication information to the UE at the notification time according to the first indication information.

With reference to one of the third aspect or the first to the eighth possible implementation manners of the third aspect, in a ninth possible implementation manner, the second indication information includes the second time.

With reference to one of the third aspect or the first to the ninth possible implementation manners of the third aspect, in a tenth possible implementation manner, the first indication information is sent by a multi-cell/multicast coordination entity MCE.

According to a fourth aspect, an embodiment of the present invention provides a multi-cell/multicast coordination entity MCE including: a determining unit, configured to determine to suspend transmitting service data in a multimedia broadcast multicast service MBSFN manner in a multimedia broadcast multicast service single frequency network MBSFN area; and a sending unit, configured to send indication information to a base station at a first time, so that the base station notifies user equipment UE that transmitting the service data in the MBSFN manner is to be suspended at a second time, where the first time is earlier than the second time, and duration between the first time and the second time is less than a multicast control channel MCCH modification period.

With reference to the fourth aspect, in a first possible implementation manner of the fourth aspect, the MCE further includes a receiving unit, configured to receive a notification message sent by the base station, where the notification message is used to indicate that congestion occurs in the MBSFN area.

With reference to the fourth aspect or the first possible implementation manner of the fourth aspect, in a second possible implementation manner, the first time includes: a first multicast channel scheduling period MSP; or a first time point; or a first transmission time interval TTI; or a first subframe.

With reference to the fourth aspect, or the first or the second possible implementation manner of the fourth aspect, in a third possible implementation manner, the second time includes: a second MSP; or a second time point; or a second TTI; or a second subframe.

With reference to one of the fourth aspect or the first to the third possible implementation manners of the fourth aspect, in a fourth possible implementation manner, the indication information is further used to indicate the second time.

With reference to the fourth possible implementation manner of the fourth aspect, in a fifth possible implementation manner, the indication information includes a first index and a second index, and the second time is an MSP indicated by the second index in the MCCH modification period corresponding to the first index.

With reference to one of the fourth aspect or the first to the fifth possible implementation manners of the fourth aspect, in a sixth possible implementation manner, the indication information is further used to indicate a notification time, so that the base station notifies, at the notification time, the UE that transmitting the service data in the MBSFN manner is to be suspended at the second time; and the notification time is earlier than the second time and later than the first time.

According to a fifth aspect, an embodiment of the present invention provides a communications system including: the base station described above and the MCE described above.

With reference to the fifth aspect, in a first possible implementation manner of the fifth aspect, the system further includes the UE, configured to receive the second indication information.

According to a six aspect, an embodiment of the present invention provides user equipment including: a receiving unit, configured to receive a MAC data packet sent by a base station; an obtaining unit, configured to obtain first indication information from the MAC data packet, where the first indication information is used to indicate that transmitting service data in an MBSFN manner is to be suspended; and an execution unit, configured to suspend receiving the service data in the MBSFN manner according to the first indication information.

With reference to the sixth aspect, in a first possible implementation manner of the sixth aspect, the first indication information may further include a second time, and the first indication information is used to indicate that transmitting the service data in the MBSFN manner is to be suspended at the second time.

With reference to the first possible implementation manner of the sixth aspect, in a second possible implementation manner, the second time includes: a second MSP; or a second time point; or a second TTI; or a second subframe.

With reference to the sixth aspect, or the first or the second possible implementation manner of the sixth aspect, in a third possible implementation manner, the execution unit is further configured to initiate establishment of a bearer, and the bearer is used to transmit the service data in a unicast manner.

With reference to the sixth aspect or the first to the third possible implementation manner of the sixth aspect, in a fourth possible implementation manner, the first indication information is carried in a MAC header of the MAC data packet.

In the embodiments of the present invention, first indication information is sent to a base station at a first time, so that the base station notifies user equipment that transmitting service data in an MBSFN manner is to be suspended at a second time. Because duration between the first time and the second time is less than a multicast control channel modification period, the user equipment is notified in a more timely manner that transmitting the service data in the MBSFN manner is to be suspended.

For ease of understanding, some related concepts of the embodiments of the present invention are described as an example for reference, as shown below:

3rd Generation Partnership Project (3GPP for short) is a project committed to develop a wireless communications network. An organization related to the 3GPP is generally referred to as a 3GPP organization.

A wireless communications network is a network for providing a wireless communications function. The wireless communications network may use different communications technologies, such as Code Division Multiple Access (CDMA for short), Time Division Multiple Access (TDMA for short), Frequency Division Multiple Access (FDMA for short), orthogonal frequency division multiple access (OFDMA for short), and single carrier frequency division multiple access (SC-FDMA for short). A wireless communications network defined by the 3GPP organization is generally referred to as a 3GPP network, and a wireless communications network defined by a non-3GPP organization is generally referred to as a non-3GPP network. A typical non-3GPP network includes a Worldwide Interoperability for Microwave Access (WiMAX for short) network, a CDMA network, a Wireless Fidelity (WiFi for short)

network, and the like. The 3GPP network may be classified into a 2G network, a 3G network, or a 4G network according to capacities, rates, and the like of different networks. A typical 2G network includes a GSM/GPRS (Global System for Mobile Communications/General Packet Radio Service) network. A typical 3G network includes a Wideband Code Division Multiple Access (WCDMA for short) network. A typical 4G network includes an LTE network. Application of the technical solutions provided in the embodiments of the present invention includes but is not limited to the LTE network, and the technical solutions may further be used in the 2/3G network or the non-3GPP network.

User equipment (UE for short) is a terminal device, which may be a mobile terminal device or an immobile terminal device. The device is mainly used to receive or send service data. For example, the UE is capable of receiving service data transmitted in an MBSFN manner. The user equipment may be distributed in a network. In different networks, the user equipment has different names, such as a terminal, a mobile station, a subscriber unit, a station, a cellular phone, a personal digital assistant, a wireless modem, a wireless communications device, a handheld device, a lap-top computer, a cordless telephone set, a wireless local loop station, and the like.

A base station (BS for short) is an access network apparatus for providing a wireless communications function. For example, in the 3GPP network, a 2G network device for providing a base station function includes a base transceiver station (BTS for short) and a base station controller (BSC for short), a 3G network device for providing a base station function includes a node B (NodeB for short) and a radio network controller (RNC for short), and a 4G network device for providing a base station function includes an evolved NodeB (eNB for short). One base station usually manages multiple cells (English: cell).

A multimedia broadcast multicast service single frequency network (MBSFN for short) is a wireless communications network using a technology for simultaneously transmitting a same waveform to a group of cells in one physical area.

An MBSFN area is an area including a group of cells in which transmission in an MBSFN manner may be cooperatively implemented.

multimedia broadcast multicast service (MBMS for short) is a service for simultaneously sending same data to multiple user equipments by using multiple base stations. Transmitting the service data in the MBSFN manner refers to using the MBSFN manner to transmit the service data, that is, multiple base stations simultaneously send the service data to multiple user equipments. This may be understood as a multicast transmission manner.

A multicast channel (MCH for short) is a channel used to transmit MBMS service data.

Multicast channel scheduling information (MSI for short) is used to indicate, to user equipment, an ending subframe in an MPS for transmission of each MBMS service data.

Time may be understood in a broad sense. The time in the embodiments of the present invention may include a time point, a transmission time interval (TTI for short), a subframe, a multicast channel scheduling period (MSP for short), and the like.

A multicast channel scheduling period is a period for scheduling an MCH.

An MBMS control channel (MCCH for short) is a channel used to transmit control information of an MBMS service.

An MCH modification period is a period for modifying control information on the MCCH. For example, it may be 5.12 seconds or 10.24 seconds.

An MBSFN subframe is a subframe used to transmit an MBMS service data.

A multi-cell/multicast coordination entity (MCE for short) is configured to configure a parameter for sending MBMS service data by multiple base stations in an MBSFN area, to ensure that all the base stations in the MBSFN area use same configuration to send the MBMS service data.

A Medium Access Control (MAC for short) data packet is a data packet at a MAC layer. The MAC data packet includes a MAC header and one or more MAC SDUs (service data unit), and one MAC SDU includes one MAC sub-header.

An M2 interface is an interface between an MCE and an eNB, and is used to transmit an M2 Application Protocol (M2AP for short) message.

A mobility management network element (MMNE for short) is a core network device used to perform mobility management on user equipment. For example, in a 2/3G network, the mobility management network element includes a serving GPRS support node (SGSN for short). In a 4G network, the mobility management network element includes a mobility management entity (MME for short).

A gateway is a core network device for transmitting user-plane data.

Suspending may be understood as terminating, stopping, or pausing.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2-1 is a schematic structural diagram of a MAC data packet according to an embodiment of the present invention;

FIG. 2-2 is a schematic structural diagram of another MAC data packet according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the embodiments of present invention.

Network architectures and service scenarios described in the embodiments of the present invention are used to more clearly describe the technical solutions in the embodiments of the present invention, instead of limiting the technical solutions provided in the embodiments of the present invention. An ordinary person in the art may know that, with evolution in the network architecture and emergence of new service scenarios, the technical solutions provided in the embodiments of the present invention are also applicable to a similar technical problem.

An LTE network is used as an example in the following description. It should be noted that, the technical solutions and technical ideas according to the embodiments of the present invention may also be used in a broadband network accessed in another radio access manner.

Figure 1:
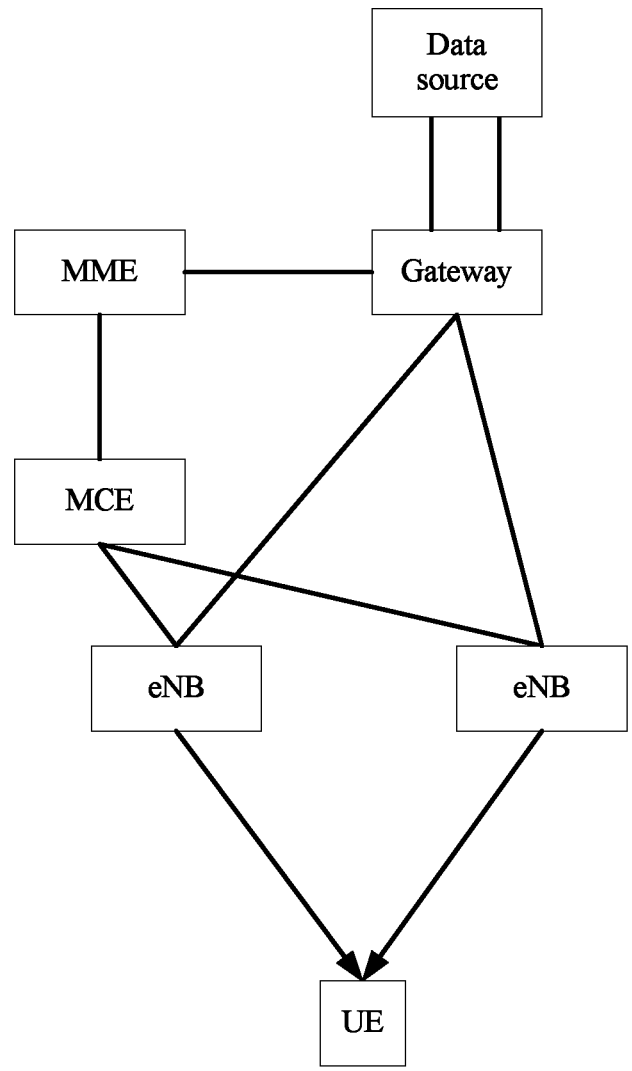
FIG. 1 is a schematic diagram of an MBMS networking architecture according to an embodiment of the present invention.

FIG. 1 shows an example of a typical MBMS networking architecture.

As shown in FIG. 1, the networking architecture includes:
a data source, configured to provide service data that needs to be transmitted to UE;
a gateway, configured to transmit the service data provided by the data source to an eNB;
an MME, configured to manage mobility of the UE, and control an eNB and the gateway to establish a data transmission bearer for the UE;
an MCE, configured to configure a parameter required by an eNB for transmitting the service data in an MBSFN manner;
multiple eNBs, configured to send, in an MBSFN manner, the service data provided by the gateway to the UE, or send the service data to the UE in a unicast manner; and
UE, configured to receive the service data sent in an MBSFN manner, or receive the service data sent in a unicast manner.

For ease of description, only two eNBs are shown in the figure. In actual configuration, one MCE may connect to multiple eNBs, and the MCE may configure the multiple eNBs, so that the multiple eNBs send same service data at a same time, and the service data is transmitted in an MBSFN manner.

For the UE, after the service data sent by the multiple eNBs in an MBSFN manner arrives at the UE, the UE does not need to distinguish between a signal sent by one eNB and a signal sent by another eNB. Signals sent by the multiple eNBs are superposed in the UE, so as to strengthen the signal, and reduce a packet error rate for transmitting the service data.

A procedure of sending service data in an MBSFN manner is generally as follows:

1. The data source may sequentially send related information, such as a characteristic of a to-be-transmitted service, a service data rate, a service data amount, and a destination area, to the gateway.

2. After receiving the information sent by the data source, the gateway allocates an IP multicast address to each eNB, and transmits the address to the MME and the MCE.

3. The MCE allocates an air interface resource to the to-be-transmitted service, notifies each eNB of the allocated air interface resource, and notifies each eNB of the IP multicast address allocated by the gateway.

4. Each eNB adds the IP multicast address allocated by the gateway into a corresponding IP multicast group, and updates reserved subframes (these reserved subframes are referred to as MBSFN subframes) according to the air interface resource allocated by the MCE. These reserved subframes are used to transmit the service data. For example, a subframe 2, a subframe 7, and a subframe 8 in each scheduling period serve as MBSFN subframes.

Till now, preparation work for sending the service data in the MBSFN manner is complete.

When the service data needs to be transmitted in the MBSFN manner:

5. The data source sends the service data to the gateway.

6. The gateway sends the service data to each eNB in an IP multicast manner.

7. Each eNB sends the service data to the UE at the air interface by using the MBSFN subframes.

For example, the service data is sent on the MCH.

Till now, a function of transmitting the service data in the MBSFN manner is implemented.

To ensure that the eNBs send same data in a same subframe, a synchronous measure needs to be taken. In a time dimension, a fixed time length of scheduling period may be divided. The data source encloses a timestamp with each data packet, and the eNB may map a data packet to a corresponding scheduling period according to the timestamp in the data packet. A data packet mapped to a scheduling period N is to be sent in a period N+1. The scheduling period herein may also become an MSP.

It can be learned that, a quantity of MBSFN subframes allocated to the service data by the MCE determines a transmission rate of the service data. A higher rate of the service data needs more MBSFN subframes to be allocated, and a lower rate of the service data needs fewer MBSFN subframes to be allocated. The MBSFN subframes are used to transmit MBMS service data only, and in consideration of resource utilization, allocating more MBSFN subframes wastes resources when the rate of the service data becomes lower. Therefore, a quantity of MBSFN subframes allocated to the MBMS service data is usually not greater than a quantity of MBSFN subframes required for an average rate. However, when the rate of the MBMS service data becomes higher, a part of the MBMS service data is discarded because the MBSFN subframes cannot hold more data.

In view of that, a part of the MBMS service may be sent to the UE in another manner, such as in a unicast manner, so that a rate of the service data sent in the MBSFN manner matches the quantity of the allocated MBSFN subframes. To realize this purpose, the UE needs to be notified in advance that transmitting data of a particular MBMS service in the MBSFN manner is to be suspended.

Because MBMS-related control information is transmitted on an MCCH, the UE may be notified by using the MCCH. That is, indication information is added into the MCCH, to notify the UE that transmitting data of a particular MBMS service in the MBSFN manner is to be stopped. However, because an MCCH modification period limits modification of the MCCH and the MCCH cannot be modified at any time, at least one MCCH modification period, that is, 5.12 seconds or 10.24 seconds, is required after the MCE notifies the eNB, the eNB notifies the UE, and the UE suspends receiving the service data in the MBSFN manner. Consequently, the UE may not be notified in a timely manner, and may not initiate, in a timely manner, establishment of a unicast bearer, thereby causing service interruption.

To notify the UE in a timely manner that transmitting data of a particular MBMS service in the MBSFN manner is to be stopped, the UE may be notified by adding corresponding indication information into a data packet of the service data sent on the MCH. For example, indication information may be carried in a MAC data packet that bears the service data. The indication information is added into the MAC data packet, so as to avoid limitation of the MCCH modification period, and reduce a time that lasts after the MCE notifies the eNB and before the UE suspends receiving the service data in the MBSFN manner.

It is assumed that data of a service A and data of a service B need to be transmitted to the UE in an MBSFN manner, and the MCE allocates a subframe 2 and a subframe 7 in each MSP as MBSFN subframes.

Figures 1, 2:
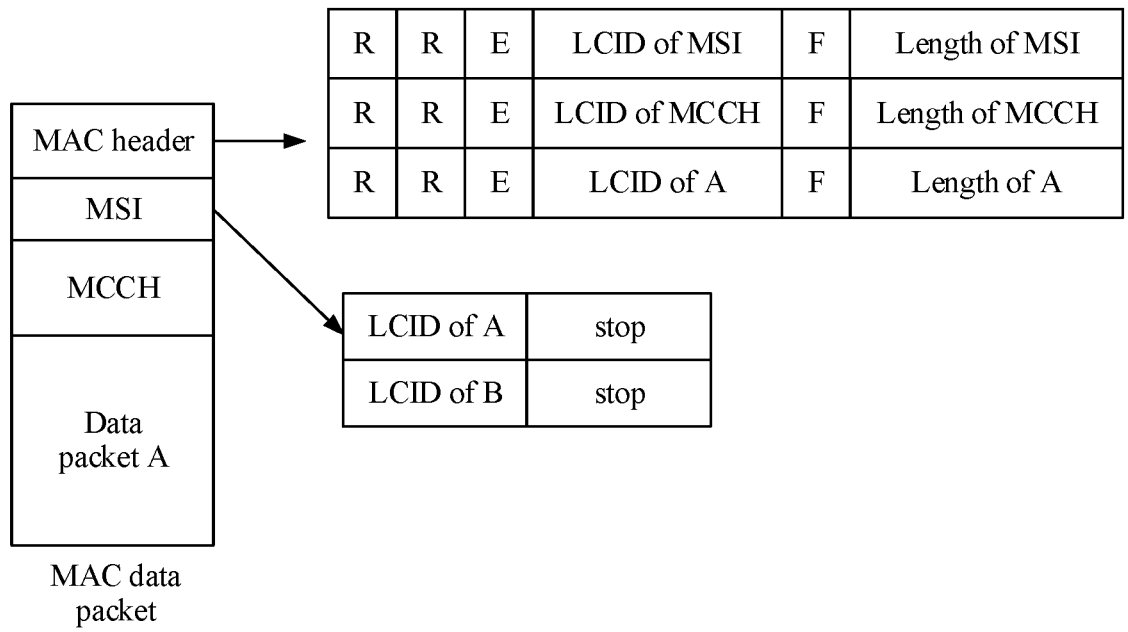
Figure 2:
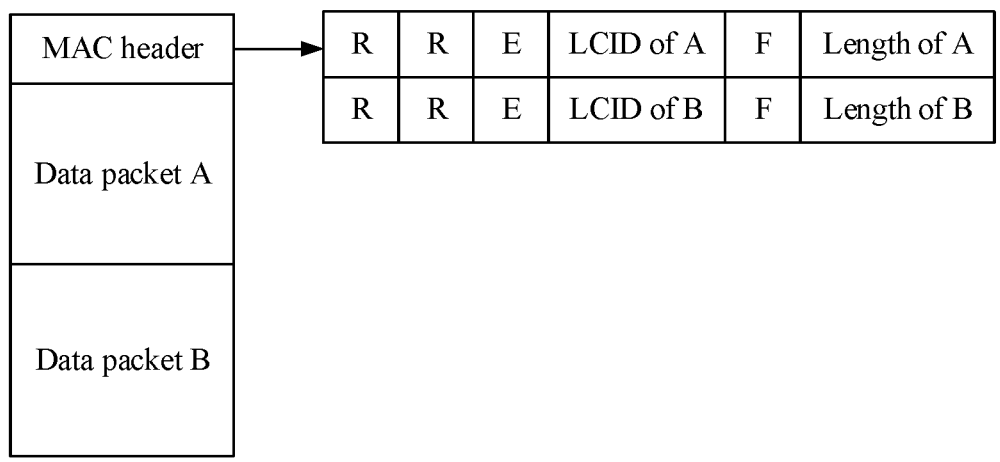

As shown in FIG. 2-1, for example, the first MAC data packet that is in the MSP and sent by the eNB by using the subframe 2 includes: a MAC header, an MSI, an MCCH, and a data packet A.

The MAC header is a MAC header of the MAC data packet, and includes three MAC sub-headers corresponding to the MSI, the MCCH, and the data packet A that are included in the MAC data packet.

For example, in the MAC sub-header corresponding to the MSI, the first field R and the second field R are reserved fields. The third field E indicates whether another MAC sub-header follows. If a value of the field is 1, it indicates that still an MAC sub-header follows; if a value of the field is 0, it indicates that a MAC sub-header does not follow. The fourth field "LCID of MSI" indicates that a MAC SDU corresponding to the MAC sub-header is MSI. The fifth field F indicates a length of a field "Length of MSI". If a value of the field is 0, it indicates that the length of the field "Length of MSI" is 7 bits; if a value of the field is 1, it indicates that the length of the field "Length of MSI" is 15 bits. The sixth field "Length of MSI" indicates a length of the MSI part.

For related content of the MAC sub-header corresponding to the MCCH and of the MAC sub-header corresponding to the data packet A, refer to related content of the MAC sub-header corresponding to the MSI. Details are not described herein.

The MSI is used to indicate an ending subframe in the MSP for transmitting the data of the service A and the data of the service B.

For example, in a first record in the MSI, a field "LCID of A" indicates that the record is corresponding to the data packet A, and a field "stop" indicates an ending MBSFN subframe in the MSP for transmitting the data packet A. For content of a second record in the MSI, refer to content of the first record. Details are not described herein.

The MCCH is used to indicate related control information for transmitting the data of the service A and the data of the service B in the MBSFN manner.

The data packet A is used to bear a part of the data of the service A.

As shown in FIG. 2-2, for example, an MAC data packet sent by the eNB by using the subframe 7 in the MSP includes: an MAC header, a data packet A, and a data packet B.

The MAC header is an MAC header of the MAC data packet, and includes MAC sub-headers corresponding to the data packet A and the data packet B that are included in the MAC data packet. For specific content of the MAC sub-header, refer to related content of the MAC header in FIG. 2-1. Details are not described herein.

The data packet A is used to bear another part of the data of the service A.

The data packet B is used to bear a part of the data of the service B.

The FIG. 2-1 and the FIG. 2-2 show examples of schematic structural diagrams of MAC data packets, and a MAC data packet structure is not limited thereto. Different MAC data packet structures may exist in different scenarios.

It is assumed that transmitting the data of the service A in the MBSFN manner is to be suspended. The following implementation manners may be considered to add the indication information into the MAC data packet, to notify the UE that transmitting the data of the service A in the MBSFN manner is to be suspended.

Manner (1): The MAC header in the MAC data packet may be modified. The MAC sub-header corresponding to the data packet A in the MAC header is overwritten.

Figures 3, 4, 5:
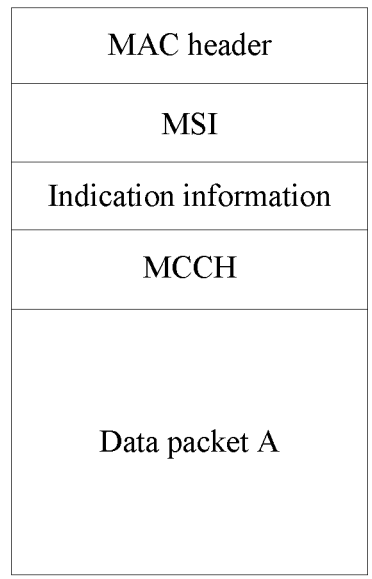
FIG. 3 is a schematic structural diagram of a MAC sub-header corresponding to a data packet A in a MAC header according to an embodiment of the present invention.
FIG. 4 is a schematic structural diagram of an added MAC sub-header corresponding to a data packet A in a MAC header according to an embodiment of the present invention.
FIG. 5 is a schematic structural diagram of still another MAC data packet according to an embodiment of the present invention.

Specifically, a reserved field of the MAC sub-header in the data packet A may be overwritten. For example, the first reserved field R is set to 1, or the second reserved field is set to 1, to indicate to the UE that transmitting, in an MBSFN manner, the data of the service A borne by the data packet A is to be suspended in a next MSP or an $M^{th}$ MSP. M may be pre-configured in the UE, or may be notified to the UE by the eNB. This is not limited in this embodiment of the present invention. As shown in FIG. 3, the first reserved field of the MAC sub-header in the data packet A is set to 1.

For another example, the first reserved field R and the second reserved field R may be combined to indicate an MSP in which transmitting the data of the service A in the MBSFN manner is suspended. For example, the first reserved field is set to 1, and the second reserved field is set to 0. This indicates that transmitting the data of the service A in the MBSFN manner is to be suspended in the second MSP after the MSP. The first reserved field is set to 0, and the second reserved field is set to 1. This indicates that transmitting the data of the service A in the MBSFN manner is to be suspended in the first MSP after the MSP. A person skilled in the art may understand that another combination manner may be used to indicate a quantity of MSPs, and details are not described herein.

Optionally, it is assumed that the MSP includes 5 MAC data packets that bear the data of the service A. The same modification may be performed on some or all MAC data packets including the data of the service A in the 5 MAC data packets in the MSP, to ensure that the UE can correctly obtain the indication information.

Manner (2): The MAC header in the MAC data packet may be modified. A new MAC sub-header corresponding to the data packet A is added to carry the indication information, to indicate to the UE that transmitting the data of the service A in the MBSFN manner is to be suspended.

As shown in FIG. 4, a field "Length of A" in the added MAC sub-header may be set to 0, and this indicates that transmitting the data of the service A in the MBSFN manner is to be suspended in a next MSP or an $M^{th}$ MSP. M may be pre-configured in the UE, or may be notified to the UE by the eNB.

Optionally, the UE may be notified, by setting the reserved field in manner (1), that transmitting the data of the service A in the MBSFN manner is to be suspended, and details are not described herein.

Optionally, the modification in Manner (2) may be performed on the multiple MAC data packets that bear the data of the service A in the MSP, to ensure that the UE can correctly obtain the indication information.

Manner (3): A MAC CE (control element) may be added into the MAC data packet, to carry the indication information, so as to indicate to the UE that transmitting the data of the service A in the MBSFN manner is to be suspended.

As shown in FIG. 5, the indication information may be added after the MSI part in the MAC data packet. A specific format of the indication information is not limited. A person skilled in the art understands that the indication information part may be added after the MCCH part or after the data packet A part, and this is not limited herein. Because the indication information part is added into the MAC data packet, a person skilled in the art understands that a MAC sub-header corresponding to the indication information needs to be added into the MAC header.

Because the MAC data packet is transmitted in each MBSFN subframe in the MSP, and modification on the MAC data packet is not limited by the MCCH modification period, compared with using the MCCH to notify the UE that transmitting the service data in the MBSFN manner is to be suspended, using the MAC data packet to notify the UE is more flexible and timely. For example, when the service data rate is to suddenly increase in a next MSP, the indication information may be carried in a MAC data packet in a current MSP, and transmitting the service data in the MBSFN manner may be suspended in the next MSP. Therefore, data transmission in the MBSFN manner is more flexible and efficient, a situation in which a service data rate increases suddenly can be properly dealt with without discarding data due to the sudden increase in the service data rate, and user experience is ensured.

The foregoing describes an example of indicating, to the UE by adding the indication information into the MAC data packet, that transmitting the service data in the MBSFN manner is to be suspended.

In consideration of a procedure, the MCE may deliver a notification to the eNB, and then the eNB delivers indication information to the UE by using a MAC data packet. For ease of understanding, the indication information delivered by the MCE to the eNB may serve as first indication information, the indication information delivered by the eNB to the UE by using the MAC data packet may serve as second indication information.

Figure 6:
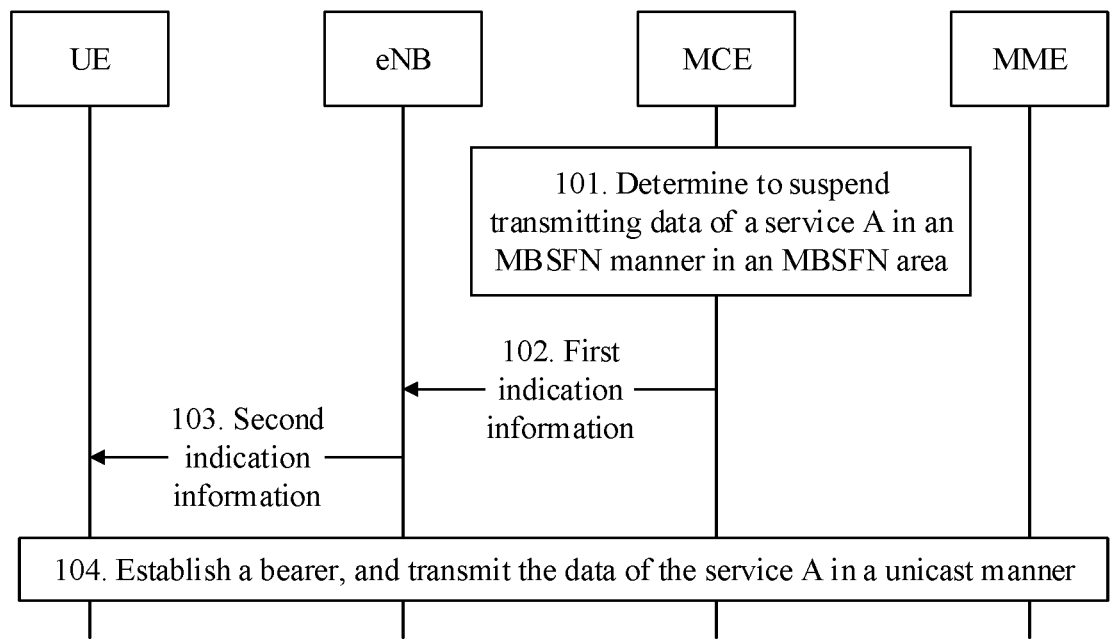
FIG. 6 is a schematic flowchart of a multimedia broadcast multicast communication method according to an embodiment of the present invention.

For example, FIG. 6 shows a multimedia broadcast multicast communication method, so that indication information carried in a MAC data packet is transmitted to UE and indicates that transmitting service data in an MBSFN manner is to be suspended.

As shown in FIG. 6:

101. An MCE determines to suspend transmitting data of a service A in the MBSFN manner at an MBSFN area.

102. The MCE sends first indication information to an eNB.

The first indication information is used to indicate that transmitting the data of the service A in the multimedia broadcast multicast service MBSFN manner is to be suspended.

103. The eNB sends second indication information to UE according to the first indication information.

The second indication information is used to indicate that transmitting the data of the service A in the MBSFN manner is to be suspended.

104. The UE interacts with a data source to establish a bearer, and the data of the service A is transmitted in a unicast manner.

For example, the MCE may determine, according to prior configuration or a congestion status in the MBSFN area, to suspend transmitting the data of the service A in the MBSFN manner.

Optionally, before step 101, the MCE may receive a notification sent by the eNB. The notification is used to indicate that congestion occurs in the MBSFN area. That is, MBSFN subframes that are used to transmit an MBMS service and allocated by the MCE cannot meet a capacity requirement for transmitting the MBMS service.

For example, the MCE may send the first indication information to all eNBs in the MBSFN area, to ensure all eNBs that transmit the data of the service A to perform corresponding actions according to the first indication information.

For example, the MCE may add the first indication information into an M2 interface message, such as an MBMS scheduling information message.

For ease of understanding, a time for sending the first indication information to the eNB by the MCE may be referred to as a first time, and a time for suspending transmitting the data of the service A in the MBSFN manner is referred to as a second time. The first time and the second time may be understood in a broad sense, such as a particular time point, a particular MSP, a particular TTI, or a particular subframe.

Optionally, the first indication information may be further used to indicate the second time, for example, carry an information element for indicating the second time.

For example, when the second time is a particular MSP, the first indication information may carry a first index and a second index. The first index is used to indicate an MCCH modification period, and the second index is used to indicate an MSP in the MCCH modification period. Therefore, a particular MSP in a particular MCCH modification period may be determined by using the first index and the second index.

Optionally, the first indication information may further include a notification time, used to indicate a time for the eNB to notify the UE, to ensure that multiple eNBs may simultaneously deliver the second indication information to the UE.

For example, the eNB may send the second indication information by adding the indication information into the MAC data packet as described above. For example, as shown in FIG. 3, the indication information is carried in a MAC sub-header corresponding to a data packet A; as shown in FIG. 4, the indication information is carried in an added MAC sub-header corresponding to a data packet A; as shown in FIG. 5, the indication information is carried in an indication information part added in a MAC data packet. Details are not described herein again.

Optionally, the second indication information may further include the second time.

For example, after receiving the second indication information, the UE may suspend, at the second time according to the prior configuration or the notification from the eNB, receiving the data of the service A in the MBSFN manner. On one hand, in a network, transmitting the data of the service A in the MBSFN manner may be suspended at the second time. On the other hand, the UE may suspend, at the second time, receiving the data of the service A in the MBSFN manner. Therefore, transmission of the data of the service A is synchronously processed at the network side and in the UE, and the network side can successfully suspend transmitting the data of the service A in the MBSFN manner. Because the second indication information is carried in the MAC data packet, duration between the second time and the first time may be less than one MCCH modification period. Compared with notifying, by using the MCCH, the UE that transmitting the data of the service A in the MBSFN manner is to be suspended, this method is more flexible and timely.

In addition, after learning in step 103 that transmitting the data of the service A in the MBSFN manner is to be suspended in the network, the UE may establish a bearer with the network, so as to continue to receive the data of the service A in a unicast manner after the second time, and ensure continuity of the service A.

To implement the procedure shown in FIG. 6, an existing MCE, eNB, and UE need to be modified.

Figure 7:
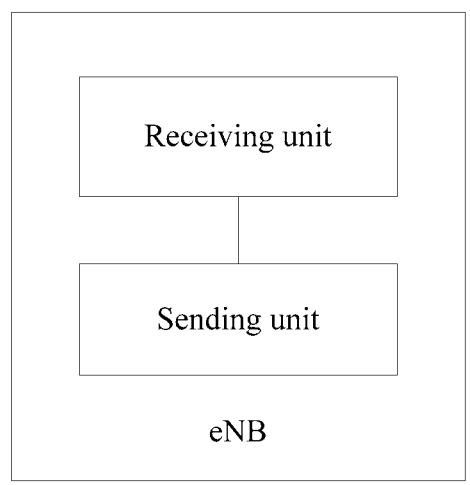
FIG. 7 is a schematic structural diagram of an eNB according to an embodiment of the present invention.

For example, as shown in FIG. 7, an eNB may include a receiving unit and a sending unit. The receiving unit receives the first indication information in step 102, and the sending unit sends the second indication information in step 103. Functions of the receiving unit and the sending unit may be implemented by a transceiver.

In another optional implementation manner, the eNB may include a processor and a memory. The memory is configured to store code for implementing the functions of the receiving unit and the sending unit. The processor may execute the code stored in the memory, to implement the functions of the receiving unit and the sending unit.

Figure 8:
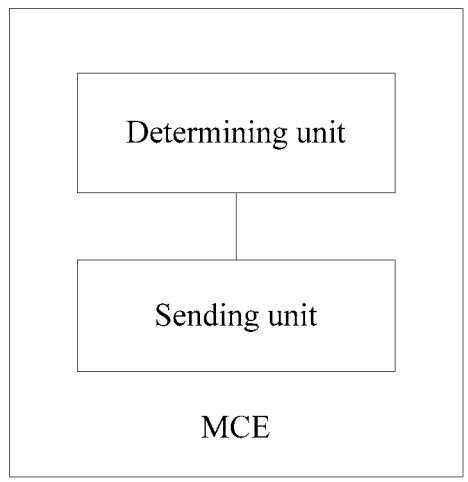
FIG. 8 is a schematic structural diagram of an MCE according to an embodiment of the present invention.

For example, as shown in FIG. 8, an MCE may include a determining unit and a sending unit. The determining unit may determine to suspend transmitting the data of the service A in the MBSFN manner in the MBSFN area in step 101, and the sending unit sends the first indication information to the eNB in step 102. Optionally, the MCE may further include a receiving unit, configured to receive a notification message that is used to indicate that congestion occurs in the MBSFN area and is sent by the eNB. The determining unit may be implemented by using the processor. The sending unit may be implemented by using a communications circuit, such as a sending circuit or a network interface card. The receiving unit may be implemented by using a communications circuit, such as a receiving circuit or a network interface card.

In another optional implementation manner, the MCE may include a processor and a memory. The memory is configured to store code for implementing functions of the determining unit, the sending unit, and the receiving unit. The processor may execute the code stored in the memory, to implement the functions of the determining unit, the sending unit, and the receiving unit.

Figure 9:
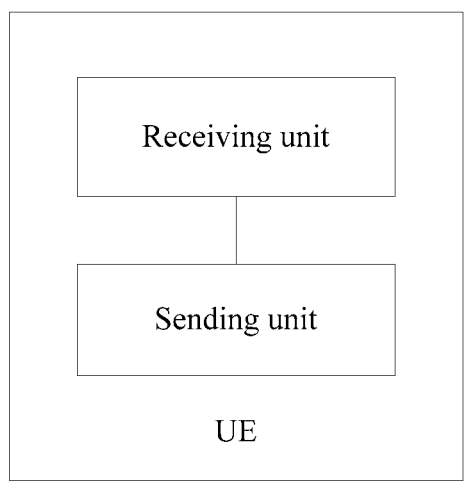
FIG. 9 is a schematic structural diagram of UE according to an embodiment of the present invention.

For example, as shown in FIG. 9, UE may include a receiving unit and a sending unit. The receiving unit may receive the second indication information in step 103, and the sending unit may send a request for establishing the bearer. The receiving unit and the sending unit may be implemented by a transceiver.

In another optional implementation manner, the UE may include a processor and a memory. The memory is configured to store code for implementing functions of the receiving unit and the sending unit. The processor may execute the code stored in the memory, to implement the functions of the receiving unit and the sending unit.

By modifying the MCE, the eNB, and the UE, the procedure shown in FIG. 6 may be implemented. That is, transmitting service data in an MBSFN manner may be suspended within duration less than one MCCH modification period. This promotes flexibility of data transmission, and can successfully deal with network impact due to sudden increase in a service data rate.

A person skilled in the art can understand that information and signals may be expressed by using any technology techniques. For example, data, an instruction (instructions), a command, information, a signal, a bit, a symbol, and a chip may be expressed by a voltage, a current, an electromagnetic wave, a magnetic field or a magnetic particle, an optical field or an optical particle (optical particles), or any combination thereof.

A person skilled in the art may further understand that various illustrative logical blocks (illustrative logic block) and steps (step) that are listed in the embodiments of the present invention may be implemented by using electronic hardware, computer software, or a combination thereof. To clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. For each specific application, a person skilled in the art may use various methods to implement the functions. However, this implementation should not be understood to go beyond the protection scope of the embodiments of the present invention.

The various illustrative logical blocks, units, and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of the present invention may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in user equipment. Alternatively, the processor and the storage medium may also be arranged in different components of the user equipment.

In one or more examples of designs, the functions described in the embodiments of the present invention may be implemented by using hardware, software, firmware, or any combination thereof. If the embodiments of the present invention are implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the embodiments of the present invention, technologies in the art may use or implement the content of the embodiments of the present invention. Any modification based on the disclosed content shall be considered obvious in the art. The basic principles described in the present invention may be applied to other variations without departing from the essence and scope of the embodiments of the present invention. Therefore, the content disclosed in the present invention is not limited to the described embodiments and designs but may also be extended to a maximum scope that is consistent with the principles and disclosed new features of the embodiments of the present invention.

What is claimed is:

1. A multimedia broadcast multicast communication method comprising:
    receiving, by a base station, a first indication information at a first time, wherein the first indication information instructs the base station to suspend transmitting service data in a multimedia broadcast multicast service single frequency network (MBSFN) manner, and wherein the first indication information further indicates a notification time; and
    sending, by the base station, a second indication information to a user equipment (UE) at the notification time according to the first indication information, wherein the second indication information instructs the UE to suspend, at a second time, transmitting the service data from the base station in the MBSFN manner;
    wherein the first time is prior to the second time, and duration between the first time and the second time is less than a multicast control channel (MCCH) modification period, and
    wherein the notification time is prior to the second time and after the first time.

2. The method according to claim 1, wherein the sending, by the base station, the second indication information to the UE at the notification time according to the first indication information comprises:
    sending, by the base station, the second indication information to the UE at the notification time according to the first indication information by adding the second indication information into a medium access control (MAC) data packet to be sent at the notification time to the UE.

3. The method according to claim 2, wherein the second indication information is carried in a MAC header of the MAC data packet.

4. The method according to claim 3, wherein the second indication information is carried in a MAC sub-header associated with the service data in the MAC header.

5. The method according to claim 1, wherein the first time comprises one of the following:
    a first multicast channel scheduling period (MSP);
    a first time point;
    a first transmission time interval (TTI); and
    a first subframe.

6. The method according to claim 5, wherein the first indication information is further used to indicate the second time.

7. The method according to claim 6, wherein the first indication information comprises a first index and a second index; and
    the second time is an MSP indicated by the second index in the MCCH modification period associated with the first index.

8. The method according to claim 1, wherein the second time comprises one of the following:
    a second multicast channel scheduling period (MSP);
    a second time point;
    a second transmission time interval (TTI); and
    a second subframe.

9. A base station comprising:
    a processor; and
    a memory coupled to the processor, wherein the memory stores processor-executable instructions which when executed causes the processor to implement operations including:
    receiving a first indication information at a first time, wherein the first indication information instructs the base station to suspend transmitting service data in a multimedia broadcast multicast service (MBSFN) manner, and wherein the first indication information further indicates a notification time; and
    sending a second indication information to a user equipment (UE) at the notification time according to the first indication information, wherein the second indication information instructs the UE to suspend, at a second time, transmitting the service data from the base station in the MBSFN manner;
    wherein the first time is prior to the second time, and duration between the first time and the second time is less than a multicast control channel (MCCH) modification period, and
    wherein the notification time is prior to the second time and after the first time.

10. The base station according to claim 9, wherein the operations further include:
    sending the second indication information to the UE at the notification time according to the first indication information by adding the second indication information into a medium access control (MAC) data packet to be sent at the notification time to the UE.

11. The base station according to claim 10, wherein the second indication information is carried in a MAC header of the MAC data packet.

12. The base station according to claim 11, wherein the second indication information is carried in a MAC sub-header associated with the service data in the MAC header.

13. The base station according to claim 9, wherein the first time comprises one of:
   a first multicast channel scheduling period (MSP);
   a first time point;
   a first transmission time interval (TTI); and
   a first subframe.

14. The base station according to claim 13, wherein the first indication information is further used to indicate the second time.

15. The base station according to claim 14, wherein the first indication information comprises a first index and a second index; and
   the second time is an MSP indicated by the second index in the MCCH modification period associated with the first index.

16. The base station according to claim 9, wherein the second time comprises one of:
   a second multicast channel scheduling period (MSP);
   a second time point;
   a second transmission time interval (TTI); and
   a second subframe.

17. The base station according to claim 9, wherein the second indication information comprises the second time.

18. The base station according to claim 9, wherein the first indication information is sent by a multi-cell/multicast coordination entity (MCE).

* * * * *